(12) United States Patent
McCoy et al.

(10) Patent No.: US 6,885,790 B2
(45) Date of Patent: Apr. 26, 2005

(54) NON-LINEAR PHOTONIC SWITCH

(75) Inventors: Christopher McCoy, Natick, MA (US); John Tsen-Tao Chen, Somerville, MA (US)

(73) Assignee: Surface Logix Inc., Brighton, MA (US)

( * ) Notice: Subject to any disclaimer, the term of this patent is extended or adjusted under 35 U.S.C. 154(b) by 4 days.

(21) Appl. No.: 10/293,752

(22) Filed: Nov. 13, 2002

(65) Prior Publication Data

US 2003/0133677 A1 Jul. 17, 2003

Related U.S. Application Data

(60) Provisional application No. 60/331,283, filed on Nov. 13, 2001.

(51) Int. Cl.[7] .......................... G02B 6/35; G02B 26/00; G02F 1/35
(52) U.S. Cl. .............................. 385/16; 385/5; 385/129
(58) Field of Search .................... 385/5, 16–23, 385/129–132

(56) References Cited

U.S. PATENT DOCUMENTS

| | | | |
|---|---|---|---|
| 4,716,449 A | 12/1987 | Miller | |
| 5,103,494 A | 4/1992 | Mozer | |
| 6,298,180 B1 | 10/2001 | Ho | |
| 6,321,571 B1 | 11/2001 | Themont et al. | |
| 6,571,028 B1 * | 5/2003 | LoCascio et al. | ............. 385/16 |

* cited by examiner

*Primary Examiner*—Akm Enayet Ullah
*Assistant Examiner*—Jerry T Rahll
(74) *Attorney, Agent, or Firm*—Kenyon & Kenyon (57) ABSTRACT

A photonic switch may be formed using one of a selected group of non-linear optical materials. Each of the materials within this group has a refractive index that demonstrates a substantial peak as a function of wavelength. The photonic switch includes a positive gain, and thus acts as a photonic transistor. In addition, a photonic switch is formed so that a gate signal is applied in a direction that is substantially perpendicular to the direction of the input signal so that there is no effective contamination of the input signal by the gate signal affecting the output signal.

10 Claims, 13 Drawing Sheets

NON-LINEAR PHOTONIC SWITCH

RELATED APPLICATION(S)

This application claims the benefit under 35 U.S.C. 119(e) of U.S. Provisional Application No. 60/331,283 filed Nov. 13, 2001, which is incorporated by reference herein.

FIELD OF THE INVENTION

The present invention relates to optical circuit devices, and in particular to optical or photonic switches made with a non-linear optical material, as well as methods of making such devices.

BACKGROUND INFORMATION

"Optical" or "photonic" switches allow selective transmission of electromagnetic signals, in particular the selective transmission of light. Photonic switches as used herein refers to any optical coupling or element having a source or input signal, an output or drain signal, and a third "gate" signal that affects the relationship between the source and gain signals. One such type of photonic switch is an optical transistor.

Figure 1A:
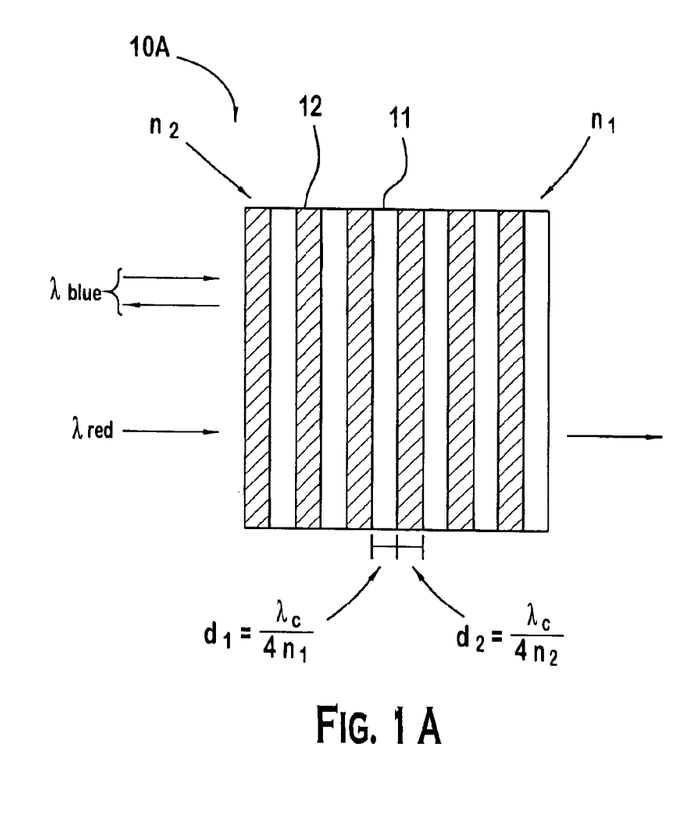
FIG. 1A is a cross-sectional schematic view of a photonic crystal according to the prior art.
Figure 1B:
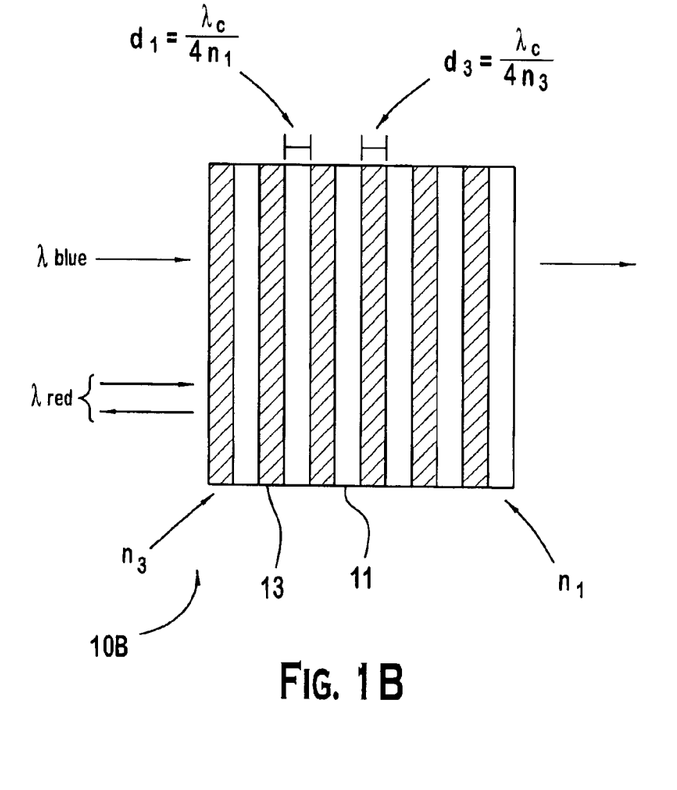
FIG. 1B is a cross-sectional schematic view of another photonic crystal according to the prior art.
Figure 1C:
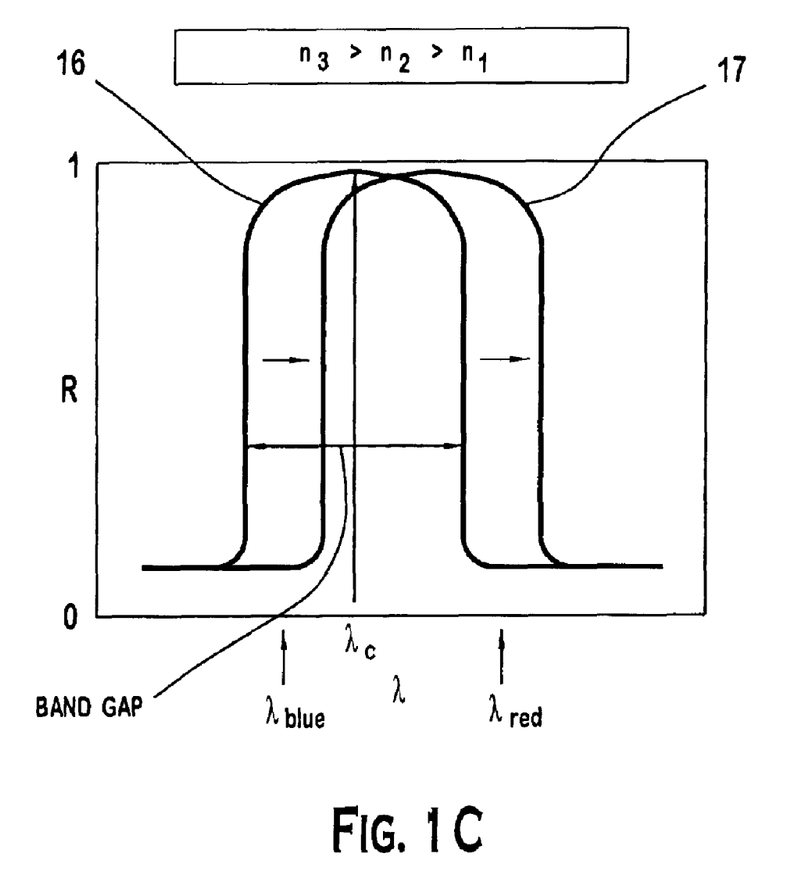
FIG. 1C is an exemplary graph of band gap functions formed by the photonic crystals of FIGS. 1A and 1B.

In a known embodiment, an optical switch can be formed using a photonic crystal. FIGS. 1A, 1B and 1C illustrate known one-dimensional photonic crystals. In general, such photonic crystals may be constructed by forming multiple, alternating layers of two materials having differing refractive indexes. If the thickness $d_1$, $d_2$ of each of the layers satisfies certain parameters (shown in FIGS. 1A and 1B), then the photonic crystal will display a "band gap" at certain wavelengths. In the case of one-dimensional (i.e. planar) photonic crystal as shown, the band gap appears for light directed normal to the plane of the device. That is, the photonic crystal will transmit light at wavelengths outside the band gap, but will reflect light of wavelengths falling within the band gap (for light generally orthogonal to the plane of the photonic crystal).

In FIG. 1A, for example, photonic crystal 10A is formed using alternating layers of a first material 11 having a refractive index $n_1$, and a second material 12 having a refractive index $n_2$. If the thicknesses $d_1$ and $d_2$ of the two layers are constructed to satisfy the equations $d_1 = \lambda_c / 4n_1$ and $d_2 = \lambda_c / 4n_2$, then photonic crystal 10A will display a band gap around wavelength $\lambda_c$. This exemplary band gap function is denoted by numeral 16 in FIG. 1C. As can be seen in the Figures, blue light, for example, having a wavelength $\lambda_{blue}$ falling within band gap 16, may be reflected by photonic crystal 10A. In contrast, red light having a wavelength $\lambda_{red}$ falling outside band gap 16 may be transmitted by photonic crystal 10A. These results are illustrated schematically in FIG. 1A. It should be noted that the red and blue colors and wavelengths specified herein are completely exemplary, and are utilized purely as a matter of convenience and clarity.

FIG. 1B illustrates a second photonic crystal 10B formed with layers of first material 11, having refractive index $n_1$, and third material 13, having refractive index $n_3$. In this case, assuming $n_3 > n_2$, as designated in FIG. 1C, the band gap of photonic crystal 10B may be shifted, for example, to higher wavelengths, as shown by the reference number 17 of FIG. 1C. In contrast to the photonic crystal 10A, in this case (again by way of example) blue light having a wavelength $\lambda_{blue}$ falls outside band gap 17, and therefore may be transmitted by photonic crystal 10B. Also in contrast to photonic crystal 10A, red light having a wavelength $\lambda_{red}$ falls within band gap 17, and therefore may be reflected by photonic crystal 10A. These results are illustrated schematically in FIG. 1B.

An optical switch may be formed from a photonic crystal by using a non-linear optical material in place of second material 12 and third material 13. In a non-linear optical material, the refractive index changes non-linearly as a function of electric field strength and linearly with intensity, according to the function shown in FIG. 2C, where $X^{(3)}$ is a material-dependent function of wavelength. In this manner, the refractive index difference between the two materials forming the photonic crystal can be adjusted, causing a shift in the device's band gap.

Figure 2A:
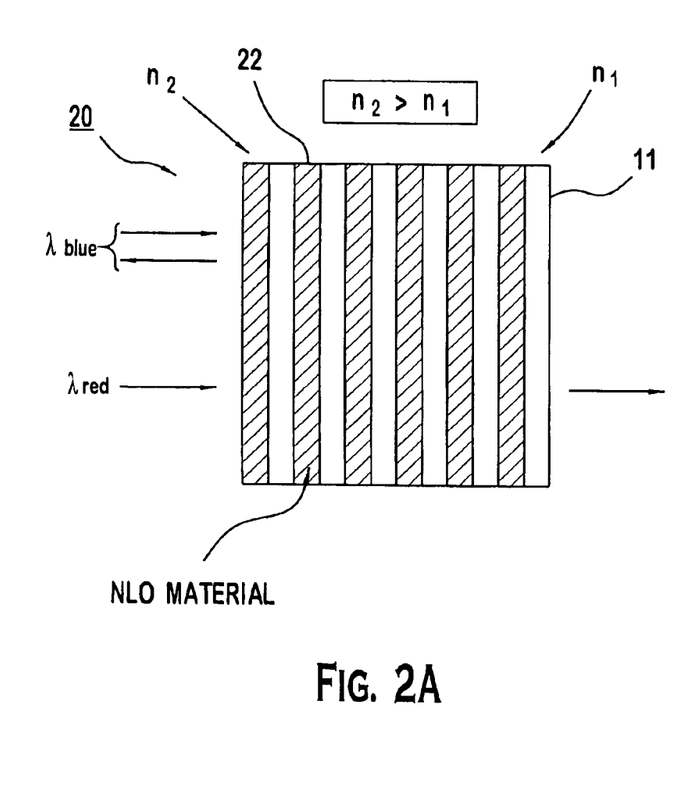
FIG. 2A is a cross-sectional schematic view of a photonic switch according to the prior art.
Figure 2B:
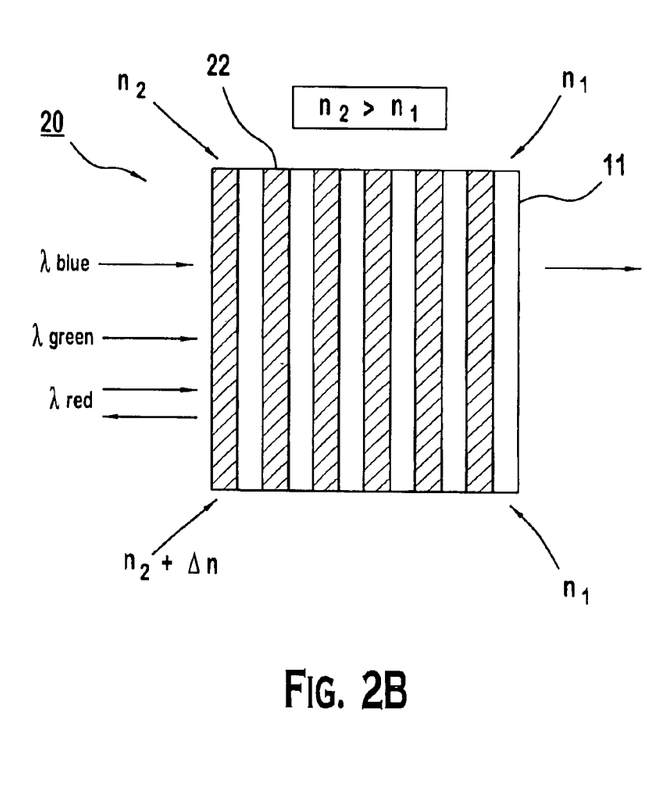
FIG. 2B is a cross-sectional schematic view of the photonic switch of FIG. 2A, with an exemplary gate signal applied.
Figure 2C:
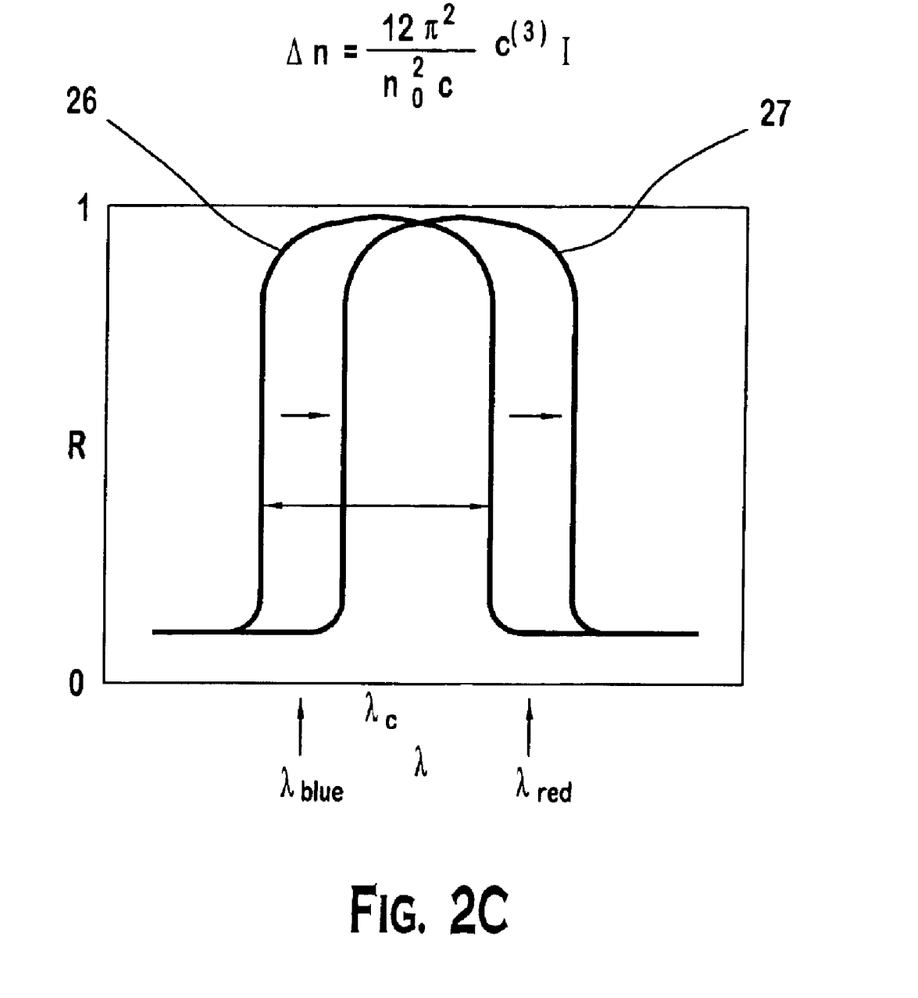
FIG. 2C is an exemplary graph of band gap functions formed by the photonic crystal of FIG. 2A.

FIGS. 2A, 2B and 2C illustrate a photonic crystal 20 formed from a first material 11 and a non-linear optical material 22, which has a refractive index that changes linearly with changing intensity and non-linearly with changing wavelength. As illustrated in FIG. 2A, when no gate signal is applied to photonic crystal 22, it obtains a band gap function as shown, for example, by reference number 26 of FIG. 2C. In contrast, when a gate signal such as $\lambda_{green}$ is applied, as shown in FIG. 2B, the difference of the refractive indices of non-linear optical material 22 and first material 11 increases. This increased ratio results in a shift in the band gap, for example to the function denoted by reference number 27 of FIG. 2C. The materials, thicknesses, and wavelength employed are selected so that a selected wavelength of an input signal falls within the first band gap 26, but outside the band gap 27 (as shown with $\lambda_{blue}$), or vice versa (as shown with $\lambda_{red}$). Gate signal $\lambda_{green}$ can therefore be selectively applied to selectively transmit or reflect input signal $\lambda_{blue}$ or input signal $\lambda_{red}$, provided that $\lambda_{blue}$ and $\lambda_{red}$ are of such intensity as to not shift the band gap themselves.

It should be noted again that the colors and wavelengths specified herein are exemplary. In practice, given a selection of materials, a certain device may gate a red source signal with a blue gate signal, or vice versa. More generally, it may be possible to gate any particular color of light with another color, given a proper selection materials and design parameters. The exemplary colors used herein for clarity should not be viewed as limitations on the scope of the invention.

Current photonic switches constructed in this manner suffer a number of shortcomings. In some cases, the incidence of a gate signal and input signal each affect the refraction index of the non-linear optical material. Thus the signals must be carefully controlled, so that the input signal itself does not adversely affect the desired shift in the band gap. Current photonic switches may also suffer interference effects between the input and gate signals that carry through to the output signal, so that the gate signal contaminates the output signal. This may occur, for example, when the input signal and gate signal are co-axial, or have substantial components in the same direction. In addition, construction of photonic crystals as described is often a time-intensive or rigorous procedure.

SUMMARY OF THE INVENTION

A photonic switch according to the present invention may be formed using one of a selected group of non-linear optical materials. Each of the materials within this group has a refractive index that demonstrates a substantial peak as a function of wavelength, where the peak occurs at a wavelength distinct from the wavelength of the input signal. The formation of a photonic switch according to the present invention allows the switch to obtain a positive gain, and thus act as a photonic transistor. In addition, a photonic switch according to the present invention may be formed so that a gate signal is applied in a direction that is substantially perpendicular to the direction of the input signal (i.e., so that there is no effective contamination of the input signal by the gate signal affecting the output signal).

A method of producing a photonic switch according to the present invention includes fabricating source and drain waveguides using micro-molding or micro-contact printing processes, or MIMIC (micro-molding in capillaries) of a UV-curable polymer. If desired, a gate waveguide may also be formed in part by these processes. The photonic switch also includes a photonic crystal formed from non-linear optical material, which may be formed, for example, using a block copolymer and nanoparticle composite in a MIMIC or μfluidics process. Such a process may employ a functionalized mold material to align the blocks.

DETAILED DESCRIPTION

FIGS. 3 through 6 illustrate embodiments and features of a photonic switch according to the present invention. In general, a photonic switch 30 according to the present invention is illustrated schematically in FIG. 3, and could include any type of optical coupling, transistor, or the like. Photonic switches as described herein generally act on a source or input signal, using a gate signal, to influence or produce a given drain or output signal.

Figure 3:
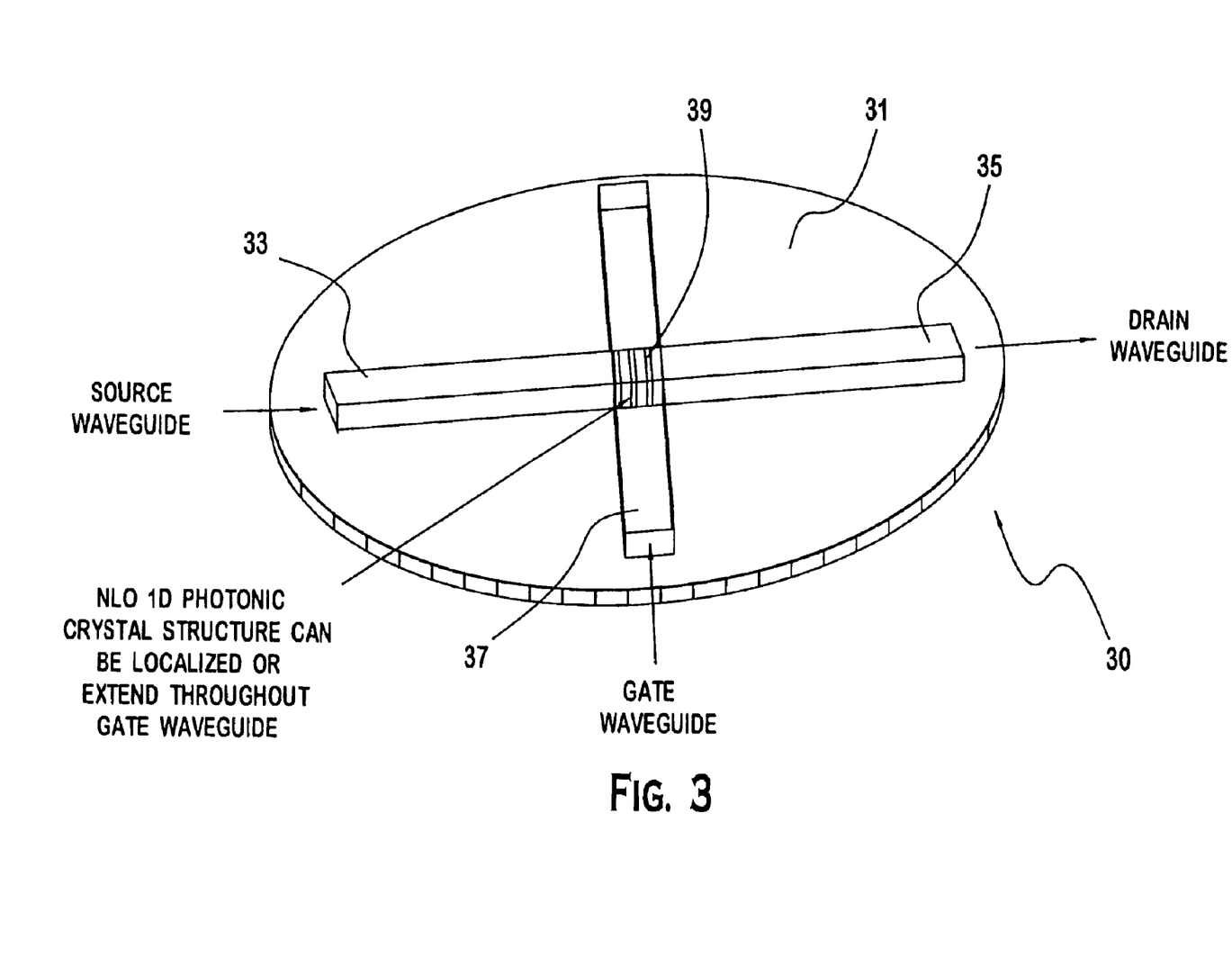
FIG. 3 is a schematic plan view of a photonic switch according to the present invention.

In the illustrated embodiment, photonic switch 30 includes a base wafer or substrate 31, which may be formed of any suitable material, for example silicon or glass. Source waveguide 33 and drain waveguide 35 are provided on opposite sides of photonic crystal 39. Source and drain waveguides 33, 35 are preferably formed from any suitable materials, for example silicon, silica, silicon oxynitride, cured sol-gel materials, UV curable polymers or other polymers. Photonic switch 30 also includes a gate waveguide 37 to provide a gate signal. It should be understood that photonic crystal 39 may be localized within gate waveguide 37, or may extend throughout the length of gate waveguide 37. Portions of gate waveguide 37 that are distinct from photonic crystal may be formed of a suitable material, for example the materials useful for source and drain waveguides 33, 35. Source and drain waveguides 33, 35 are preferably disposed substantially perpendicular to gate waveguide 37, as discussed further below.

Figure 4:
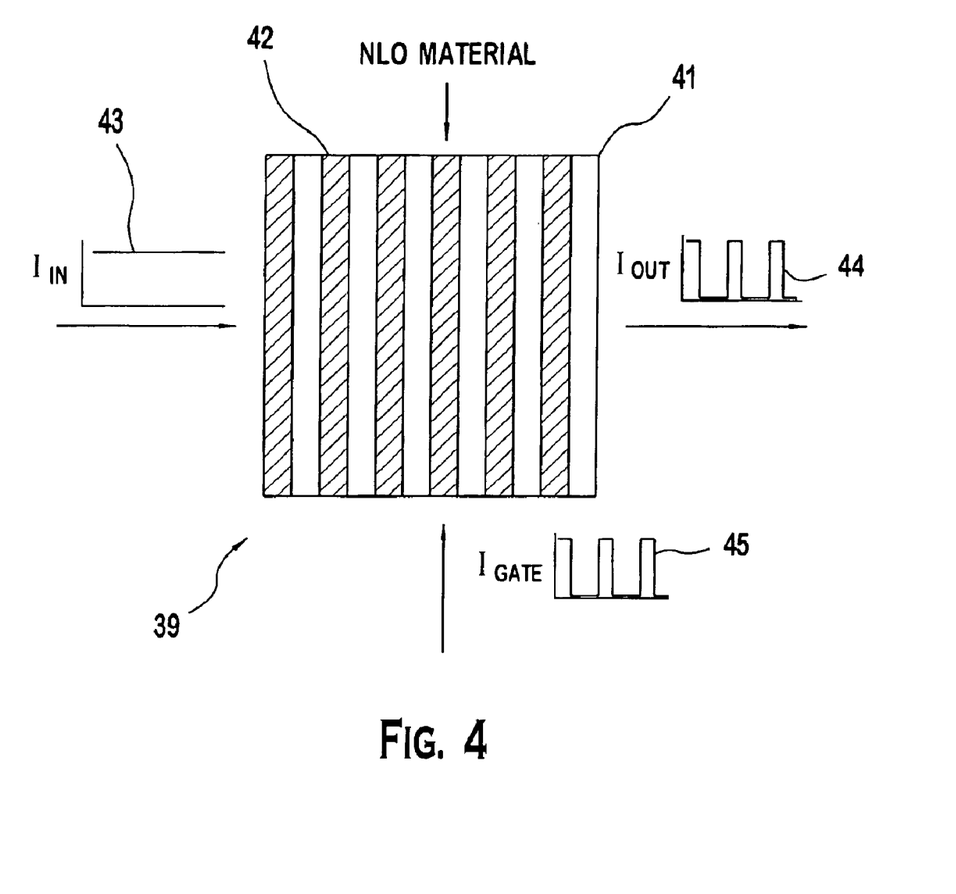
FIG. 4 is a schematic view of a photonic switch according to the present invention.
Figure 5:
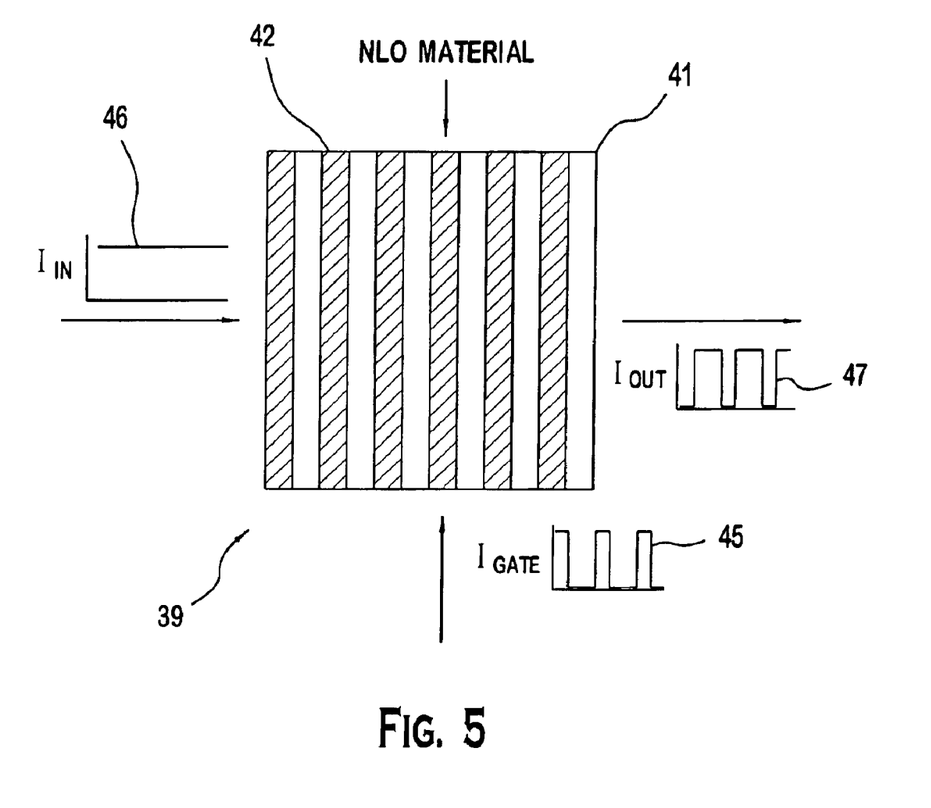
FIG. 5 is a second schematic view of the photonic switch of FIG. 4, with an alternative input signal wavelength.

The photonic crystal 39 and its workings are more particularly illustrated in FIGS. 4 and 5. As shown in FIG. 4, photonic crystal 39 includes a plurality of alternating layers formed by an optically-linear material 41 and a non-linear optical material 42. Alternatively, in another exemplary embodiment, each of the materials 41, 43 is a non-linear optical material, but having $X^{(3)}$ values of opposite sign. As described above, photonic crystal 39 will demonstrate a band gap, reflecting light within certain wavelengths. In addition, the band gap will shift in response to a gate signal 45. Such a shift is graphically represented in FIG. 2C.

As further shown in FIG. 4, an input signal 43 approaches photonic crystal 39 through a waveguide (not illustrated in FIGS. 4 and 5). The frequency of the input signal 43 is selected so that it generally falls near the edge of a band gap. Specifically, in this illustrated embodiment, input signal 43 falls within the band gap when no gate signal 45 is provided, but outside the band gap when a gate signal 45 is provided. Thus input signal 43 is reflected when no gate signal 45 is applied, but transmitted when gate signal 45 is applied. When the gate signal 45 is modulated as shown in FIG. 4, these parameters result in the illustrated output signal 44. As noted above, the selection of materials and design parameters may guide the selection of wavelength, and in general colors as used herein are exemplary.

Preferably, gate signal 45 is provided from a direction perpendicular to the direction of input signal 43. This arrangement minimizes interference between input signal 43 and gate signal 45 in the direction of input signal 43, minimizing contamination of output signal 44.

FIG. 5 shows the same photonic crystal 39, but a differing input signal 46. In this case, input signal 46 is selected to fall outside the band gap when no gate signal 45 is applied, but within the band gap when gate signal 45 is applied. If the same modulated gate signal 45 is provided, the system in FIG. 5 displays an output signal 47, which is generally opposite that of output signal 44 in FIG. 4.

Figure 6:
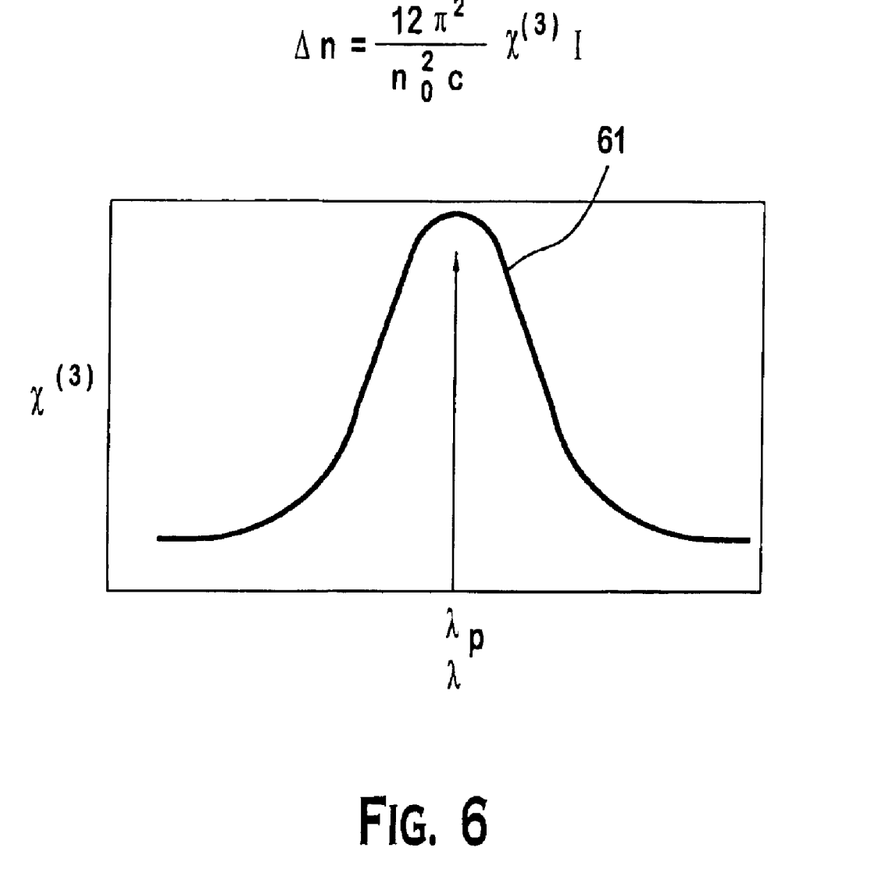
FIG. 6 is a graph illustrating a refractive index peak of a material for use in a photonic switch according to the present invention.

FIG. 6 illustrates a graphical function demonstrating another preferred feature of photonic switch 30 according to the present invention. As noted above, in general, a non-linear optical material has a refractive index that is dependent on intensity and wavelength. In photonic switch 30 according to the present invention, the non-linear photonic material 42 is preferably selected from a group of materials whose refractive index shows a substantial peak 61 at a given wavelength, $\lambda_p$. In other words, the material 42 demonstrates a wavelength-dependent $X^{(3)}$ with a large or prominent peak value at $\lambda_p$, as shown in FIG. 6.

In this manner, photonic switch 30 can be formed as a photonic transistor. Specifically, photonic switch 30 can be controlled by a gate signal 45 having wavelength equal to or near $\lambda_c$. A gate signal 45 of this wavelength will have a substantial effect on the refractive index of the non-linear optical material 42, because $\lambda_p$ represents the prominent peak wavelength for $X^{(3)}$. In contrast, if the wavelength of the input signal 43 is distinct from $\lambda_p$, it will have far less effect on the refractive index of the non-linear optical material 42. The selection of these materials and wavelengths will therefore allow switching of photonic switch 30 with a gate signal 45 having an intensity significantly lower than the intensity of input signal 43, minimizing interference or other distortion or contamination. In addition, because the variation in the intensity of the output signal 44 (an an absolute sense) is greater than the variation of the gate signal 45, the switch 30 demonstrates a positive gain, and can therefore be considered a photonic transistor.

The optical transistor described above can be used to construct a number of optical logic gates according to the present invention. FIGS. 7 through 11 illustrate a series of logic gates, specifically an inverter, AND, NAND, OR, and NOR gates. In each of these Figures, the gates are constructed using two different types of optical transistor. The first type gates a first color (for example blue) with a second color (for example red), while the second type gates the second color with the first color.

Thus in the exemplary embodiments of FIGS. 7 through 11, optical transistor 205 gates a blue source channel 201 with a red gate, while optical transistor 207 gates a red source channel 203 with a blue gate. In the exemplary embodiments, the blue source channel is a 415 nm signal, for example formed by a GaN laser, while the red source channel is a 760 nm signal, for example formed by a AlGaAs laser. Thus for optical transistor 205, the transistor 205 will output a blue signal in response to a positive red gate signal, and will output no signal when no red gate signal is present. Likewise, for optical transistor 207, the transistor 207 will output a red signal in response to a positive blue gate signal, and will output no signal when no blue gate signal is present.

In each Figure, the gate signals are provided by the input or inputs to the logic gate, which result in a single output or drain channel for each logic gate. The input and output signals, as well as internal signals between optical transistors 205, 207, are carried by waveguides 211. It should be understood that each optical transistor 205, 207 is formed with a specific set of materials and design parameters that may be unrelated to the materials and design parameters of the other optical transistor 207, 205. It should also be understood that the colors blue and red are exemplary, and used for purposes of clarity.

Figure 7:
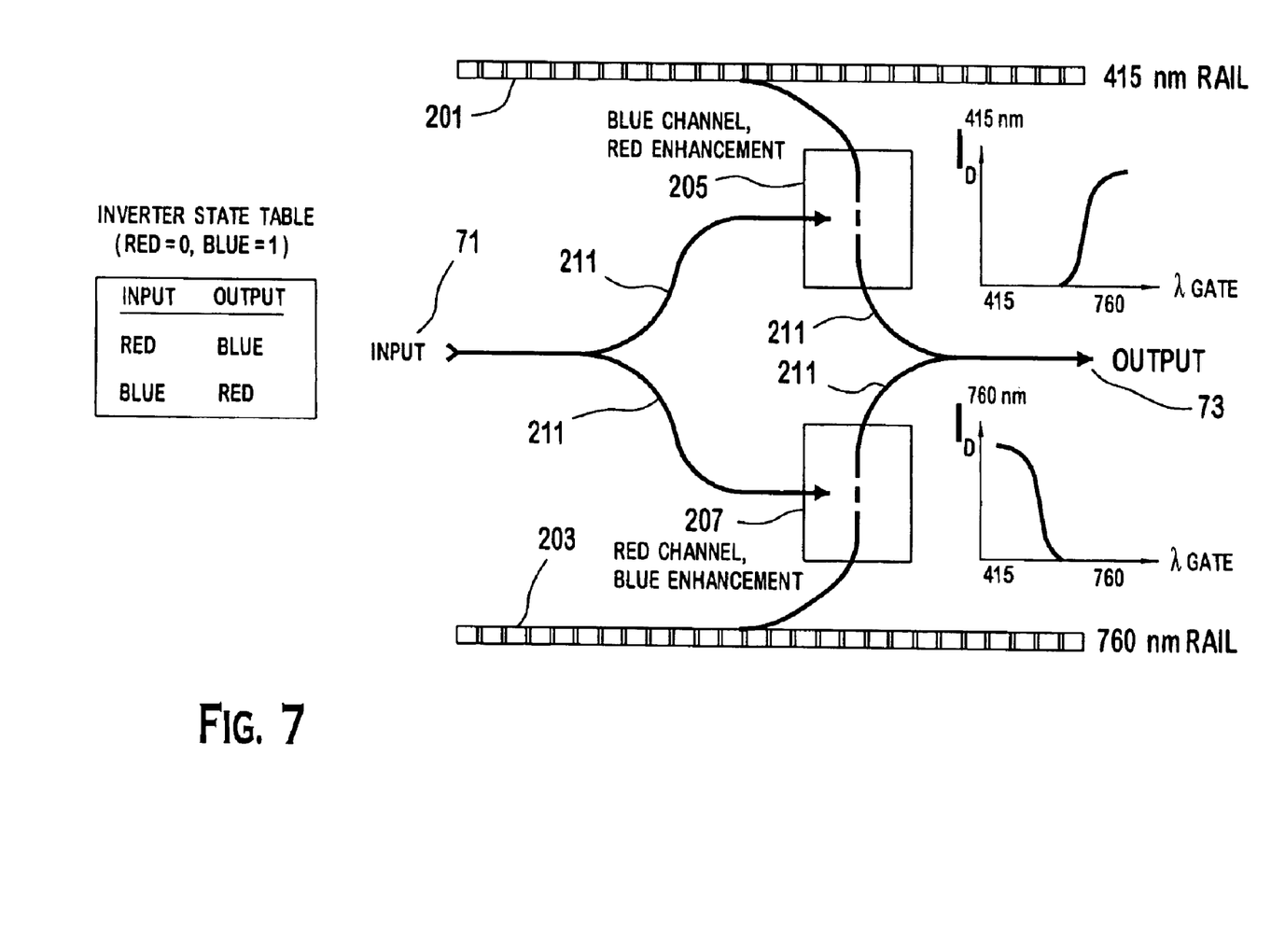
FIG. 7 is a schematic illustration of a photonic inverter gate according to an embodiment of the present invention.

FIG. 7 schematically illustrates a photonic inverter gate according to the present invention. Input signal 71 is provided as either red or blue. Output signal 73 is red or blue according to the Inverter State Table provided in FIG. 7.

Figure 8:
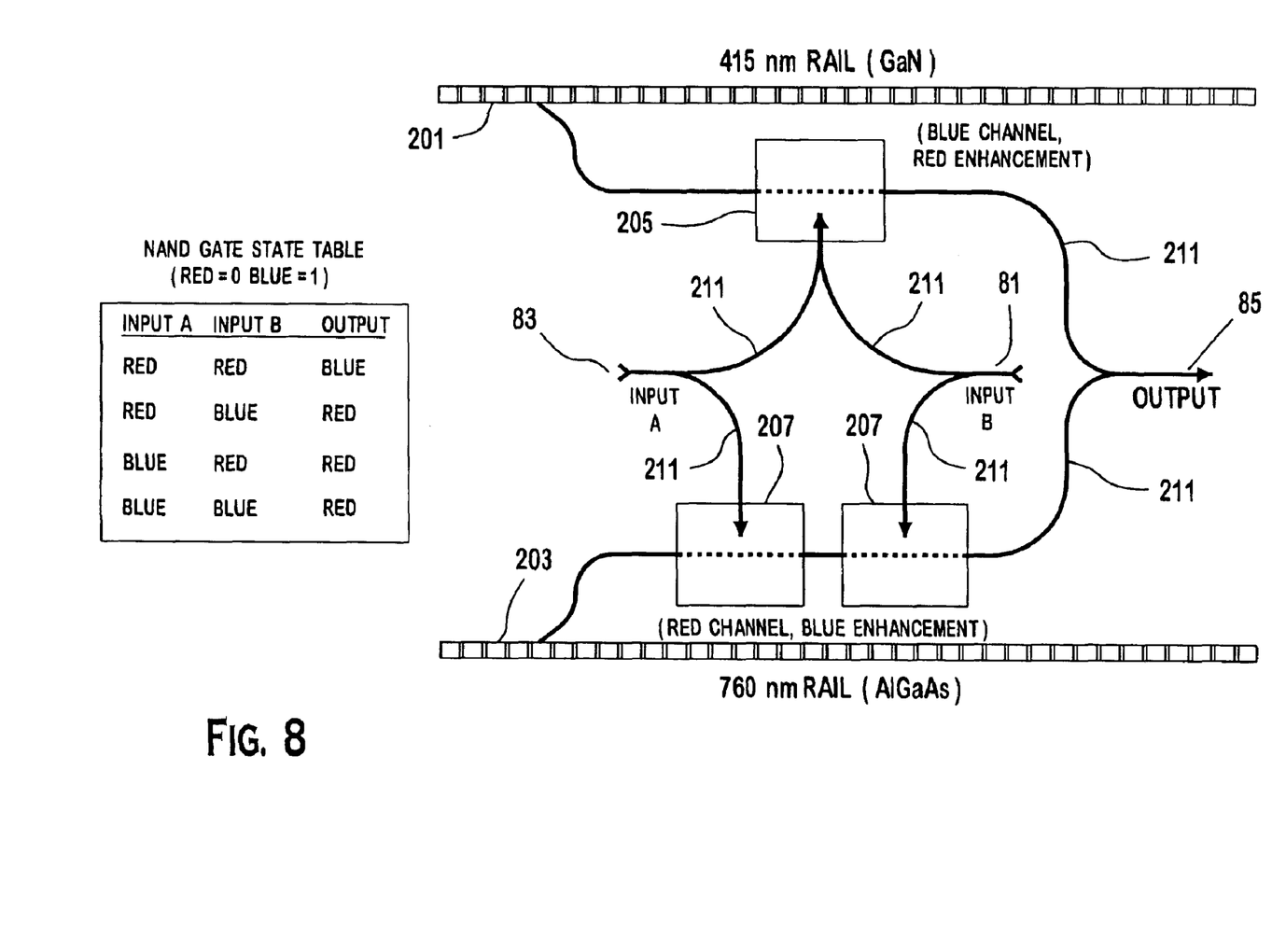
FIG. 8 is a schematic illustration of a photonic NAND gate according to an embodiment of the present invention.

FIG. 8 schematically illustrates a photonic NAND gate according to the present invention. A pair of input signals 81, 83 are each provided as red or blue. Output signal 85 is red or blue according to the NAND State Table provided in FIG. 8. It should be noted that the multiple inputs 81, 83 to a single optical transistor 205 differs from the analogous circuitry of a corresponding electronic NAND gate, where such multiple inputs would cause a short circuit. Likewise, the two optical transistors 207 provided in series differ from the analogous circuitry of a corresponding electronic NAND gate. Here the series connection is possible because the gate signal is an absolute (a wavelength) rather than a voltage, which is measured relative to source and drain. These distinguishing features are present in the optical logic gates shown in FIGS. 9 through 11, as well.

Figure 9:
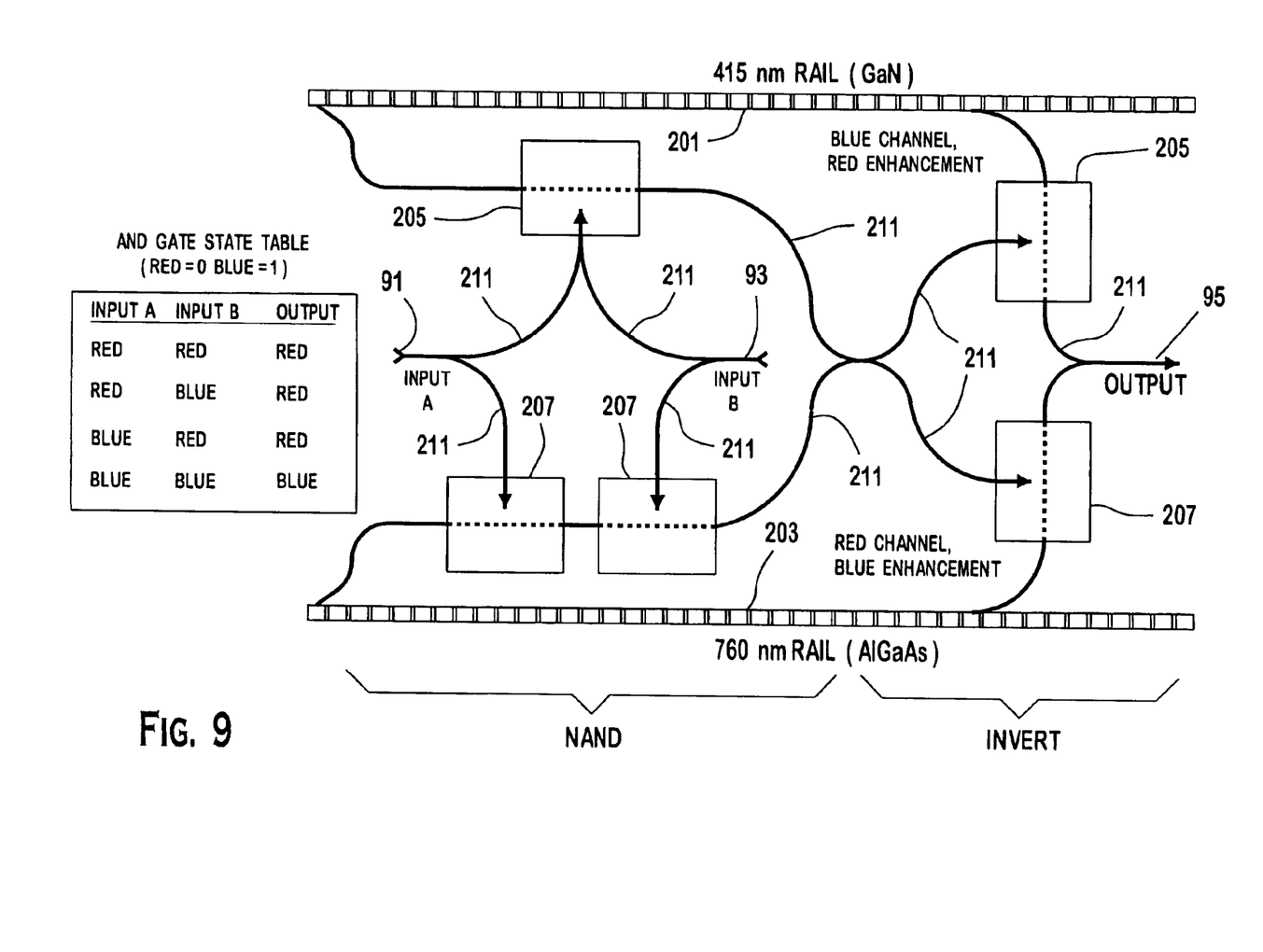
FIG. 9 is a schematic illustration of a photonic AND gate according to an embodiment of the present invention.

FIG. 9 schematically illustrates a photonic AND gate according to the present invention. A pair of input signals 91, 93 are each provided as red or blue. Output signal 95 is red or blue according to the AND State Table provided in FIG. 9.

Figure 10:
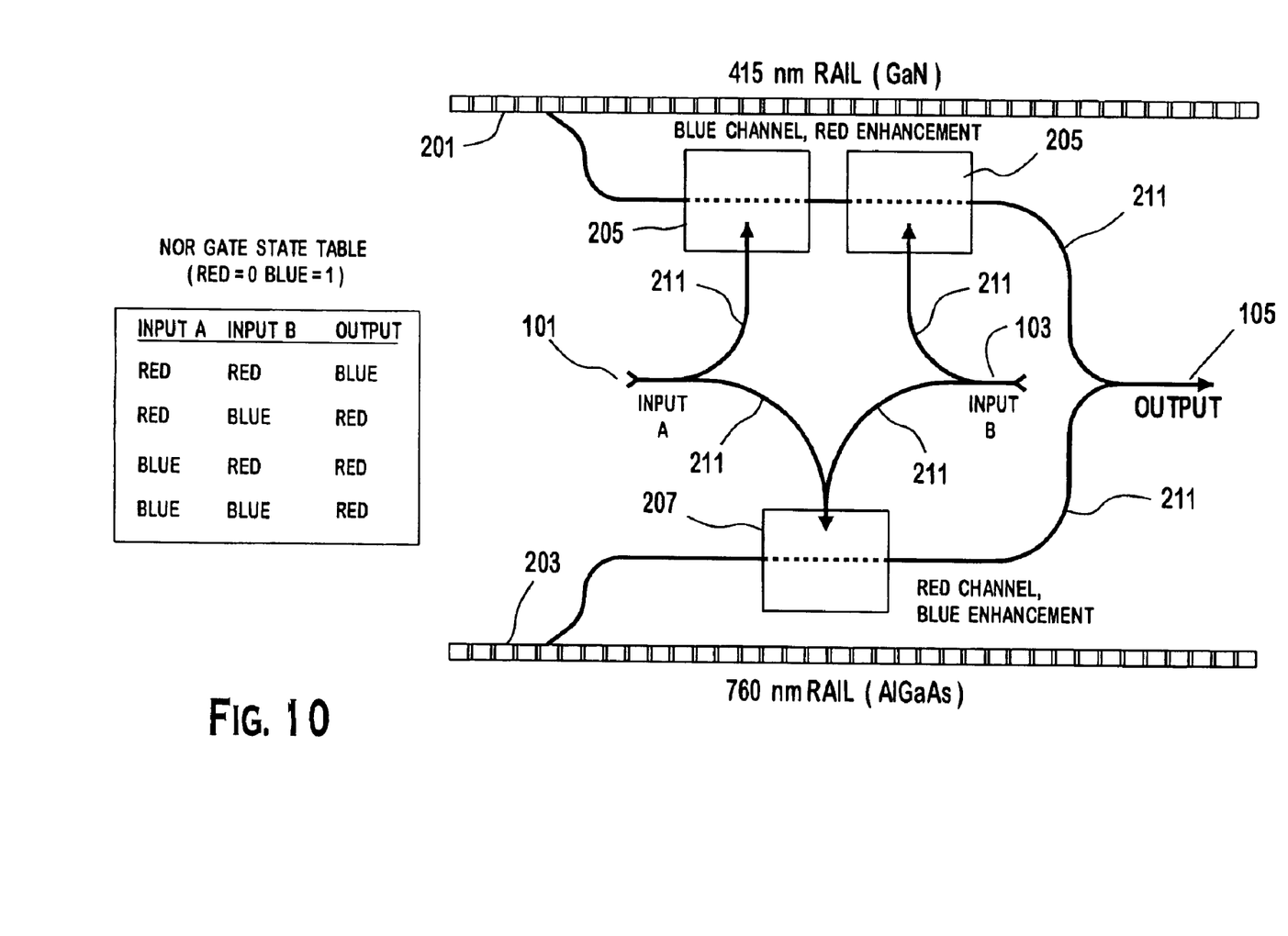
FIG. 10 is a schematic illustration of a photonic AND gate according to an embodiment of the present invention.

FIG. 10 schematically illustrates a photonic NOR gate according to the present invention. A pair of input signals 101, 103 are each provided as red or blue. Output signal 105 is red or blue according to the NOR State Table provided in FIG. 10.

Figure 11:
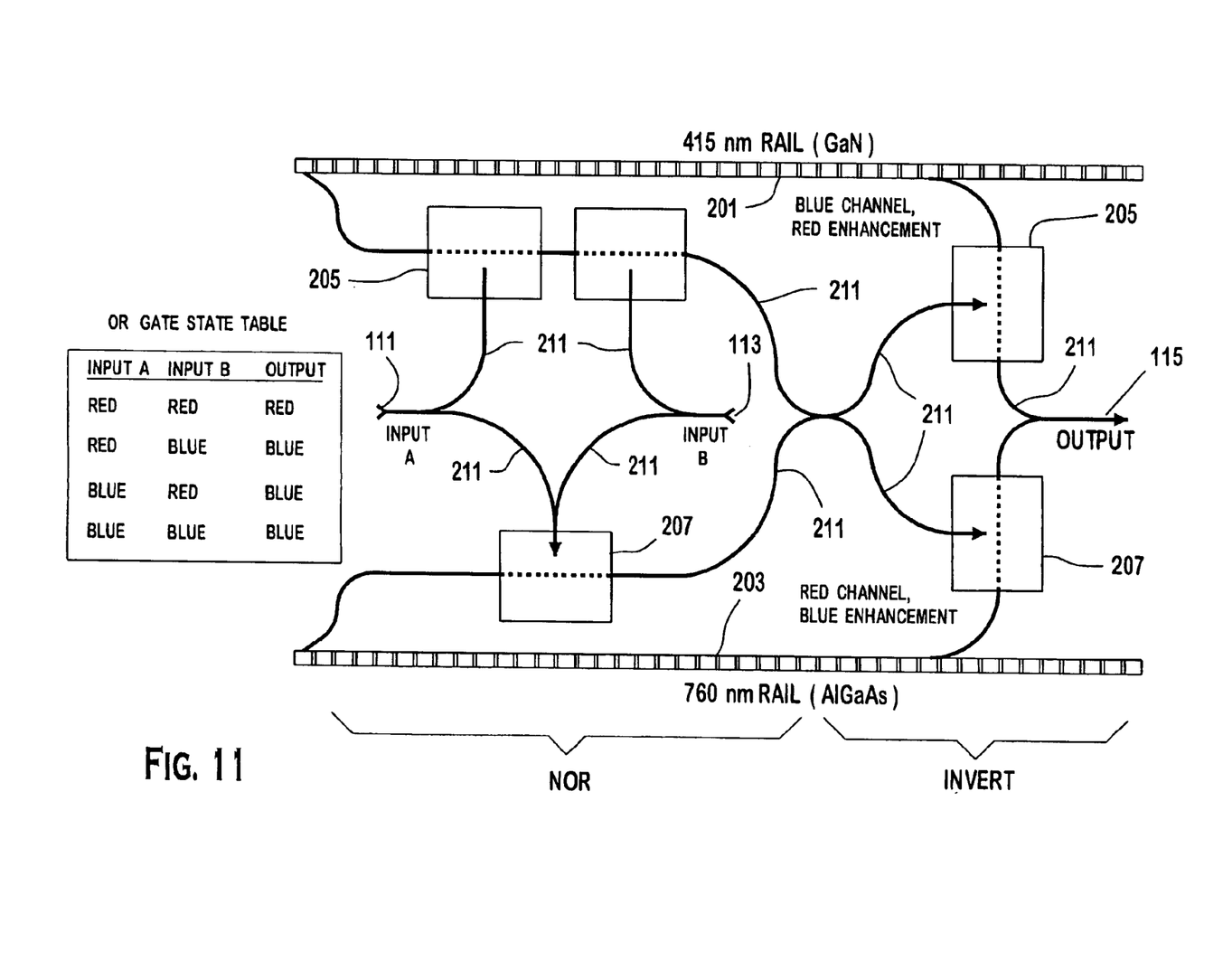
FIG. 11 is a schematic illustration of a photonic OR gate according to an embodiment of the present invention.

FIG. 11 schematically illustrates a photonic OR gate according to the present invention. A pair of input signals 111, 113 are each provided as red or blue. Output signal 115 is red or blue according to the OR State Table provided in FIG. 11.

Non-linear optical materials for use with the present invention may exhibit other useful properties, in addition to the wavelength-dependent $X^{(3)}$ with large peak value. For example, preferred materials may have refractive indices preferably between 1.2 and 3.5, as found in a number of optically useful materials. In addition, the non-linear optical material may preferably exhibit low optical loss, allowing for a more complete transmission of the input signal to drain waveguide 65. Also, the non-linear optical material may preferably act as a gain medium, thereby optically amplifying the output signal.

Suitable non-linear optical materials, as well as suitable optically-linear materials, include organic, inorganic, and hybrid materials. Suitable organic materials may include non-linear optical polymers, optically-linear polymers, UV curable polymers, liquid crystals, block copolymers or other self-assembling polymers, or small molecules. Composites of such materials may also be useful. Inorganic materials may include various semiconductors, metals, oxides, carbides, nitrides, ceramics, or nanoparticles. Nanoparticle materials themselves may include any of the materials described herein. Hybrid materials may include sol-gel precursors or polymer/nanoparticle composites (either block copolymers or other suitable polymers). The latter materials may be particularly useful, exhibiting wavelength dependent refractive properties with high $X^{(3)}$ peak values.

In a method of making a photonic switch according to the present invention, a photonic switch 30 includes source and drain waveguides 33, 35 that may be fabricated using micro-molding or micro-contact printing processes, or MIMIC of a UV-curable polymer. If desired, a gate waveguide 37 may also be formed in part by these processes. The photonic switch 30 also includes a non-linear optical material photonic crystal 39, which may be formed, for example, using a block copolymer and nanoparticle composite in a MIMIC or $\mu$fluidics process. Such a process may employ a functionalized mold material, for example an elastomer such as polydimethylsiloxane, to align the blocks. In a MIMIC process, for example, the opposing surfaces of channels within a PDMS mold could be treated by surface chemistry to yield a surface preferential for one of the blocks, thereby templating phase separation of the block copolymer in a direction normal to the channel walls.

In an alternative fabrication method, micro-molding, micro-contact printing or a MIMIC process could be used to form source and drain waveguides 33, 35 and gate waveguide 37, as well as the optically-linear portions of photonic crystal 39. This could occur in multiple steps or as a single process step. Non-linear optical material may then be placed within the gaps between the optically-linear portions of the photonic crystal 39, using any suitable process such as those mentioned above.

The device according to the present invention has been described with respect to several exemplary embodiments. It can be understood, however, that there are many other variations of the above-described embodiments which will be apparent to those skilled in the art, even where elements have not explicitly been designated as exemplary. It is understood that these modifications are within the teaching of the present invention.

What is claimed is:

1. A non-linear photonic switch comprising:
a first non-linear optical material having a refractive index that demonstrates a substantial peak as a function of wavelength.

2. The non-linear photonic switch of claim 1, further comprising:
a linear optical material.

3. A non-linear photonic switch comprising:
a first non-linear optical material having a refractive index that demonstrates a substantial peak as a function of wavelength; and
a second non-linear optical material having an $X^{(3)}$ value of opposite sign with respect to the first non-linear optical material.

4. A non-linear photonic comprising:
a first non-linear optical material having a refractive index that demonstrates a substantial peak as a function of wavelength;
wherein a refractive index of the non-linear optical material varies between 1.2 and 3.5.

5. A non-linear photonic switch comprising:
a source waveguide for receiving an input signal;
a photonic crystal having first side coupled to the source waveguide, a second side, and a third side;
a gate waveguide coupled to the third side of the photonic crystal for receiving a gate signal; and
a drain waveguide coupled to the second side of the photonic crystal for propagating an output signal;
wherein the photonic crystal includes a first non-linear optical material having a refractive index that demonstrates a substantial peak as a function of wavelength.

6. The non-linear photonic switch of claim 5, wherein the second side of the photonic crystal is positioned opposite from the first side, and the third side of the photonic crystal is positioned substantially perpendicular to the first and second sides such that the gate waveguide is disposed substantially perpendicular to the source waveguide and the drain waveguide.

7. The non-linear photonic switch of claim 6, wherein the photonic crystal demonstrates a band gap which shifts in response to receiving a gate signal propagated along the gate waveguide.

8. A non-linear photonic switch comprising:
a source waveguide for receiving an input signal;
a photonic crystal having first side coupled to the source waveguide, a second side, and a third side;
a gate waveguide coupled to the third side of the photonic crystal for receiving a gate signal; and
a drain waveguide coupled to the second side of the photonic crystal for propagating an output signal;
wherein the photonic crystal includes a first non-linear optical material having a refractive index that demonstrates a substantial peak as a function of wavelength;
wherein the second side of the photonic crystal is positioned opposite from the first side, and the third side of the photonic crystal is positioned substantially perpendicular to the first and second sides such that the gate waveguide is disposed substantially perpendicular to the source waveguide and the drain waveguide; and
wherein the photonic crystal includes a plurality of alternating layers formed by the non-linear optical material and a second non-linear optical material having a $X^{(3)}$ value of opposite sign with respect to the first non-linear optical material.

9. A non-linear photonic switch comprising:
a source waveguide for receiving an input signal;
a photonic crystal having first side coupled to the source waveguide, a second side, and a third side;
a gate waveguide coupled to the third side of the photonic crystal for receiving a gate signal; and
a drain waveguide coupled to the second side of the photonic crystal for propagating an output signal;
wherein the photonic crystal includes a first non-linear optical material having a refractive index that demonstrates a substantial peak as a function of wavelength;
wherein the second side of the photonic crystal is positioned opposite from the first side, and the third side of the photonic crystal is positioned substantially perpendicular to the first and second sides such that the gate waveguide is disposed substantially perpendicular to the source waveguide and the drain waveguide; and
wherein the photonic crystal includes a plurality of alternating layers formed by an optically-linear material and the non-linear optical material.

10. A non-linear photonic switch comprising:
a source waveguide for receiving an input signal;
a photonic crystal having first side coupled to the source waveguide, a second side, and a third side;
a gate waveguide coupled to the third side of the photonic crystal for receiving a gate signal; and
a drain waveguide coupled to the second side of the photonic crystal for propagating an output signal;
wherein the photonic crystal includes a first non-linear optical material having a refractive index that demonstrates a substantial peak as a function of wavelength;
wherein the second side of the photonic crystal is positioned opposite from the first side, and the third side of the photonic crystal is positioned substantially perpendicular to the first and second sides such that the gate waveguide is disposed substantially perpendicular to the source waveguide and the drain waveguide; and
wherein an intensity of the output signal is controlled by an intensity of the gate signal, a variation of the intensity of the output signal having a positive gain with respect to a variation in intensity of the gate signal.

* * * * *